United States Patent [19]

Schultz

[11] Patent Number: 4,505,458
[45] Date of Patent: Mar. 19, 1985

[54] LINEAR FRICTION DAMPED MECHANISM-RETURN DEVICES

[75] Inventor: John C. Schultz, Buffalo, N.Y.

[73] Assignee: Houdaille Industries, Inc., Ft. Lauderdale, Fla.

[21] Appl. No.: 438,748

[22] Filed: Nov. 3, 1982

[51] Int. Cl.³ .................. B60G 13/00; B60G 15/00; F16F 9/00; F16F 11/00
[52] U.S. Cl. ..................... 267/9 B; 213/22
[58] Field of Search ............. 267/8 R, 9 R, 9 B, 9 C, 267/172, 60, 156, 62, 166, 61 R, 61 S, 59, 180; 188/129, 130, 134, 381, 67, 216; 213/22-24, 26, 29-31, 32 R, 32 A, 34, 35, 36, 37, 38, 40, 41, 42

[56] References Cited

U.S. PATENT DOCUMENTS

| | | | |
|---|---|---|---|
| 2,572,453 | 10/1951 | Dentler | 213/31 |
| 2,705,633 | 4/1955 | Potter, Jr. et al. | 188/129 X |
| 2,844,366 | 7/1958 | Butterfield | 188/129 X |
| 3,054,478 | 9/1962 | Rumsey | 267/9 C X |
| 3,300,042 | 1/1967 | Gordon | 267/62 |
| 3,480,268 | 11/1969 | Fishbaugh | 267/9 R X |
| 3,741,406 | 6/1973 | Anderson | 213/22 X |
| 4,018,428 | 4/1977 | Weir | 267/62 X |

FOREIGN PATENT DOCUMENTS

| | | | |
|---|---|---|---|
| 325723 | 1/1916 | Fed. Rep. of Germany | 213/22 |
| 476695 | 5/1929 | Fed. Rep. of Germany | 267/9 B |
| 1180366 | 7/1957 | France | 267/62 |
| 14688 | 6/1926 | Netherlands | 213/34 |
| 264003 | 1/1927 | United Kingdom | 267/9 R |

Primary Examiner—Douglas C. Butler
Attorney, Agent, or Firm—Hill, Van Santen, Steadman & Simpson

[57] ABSTRACT

A linear stroke friction damped device adapted for resetting relatively moveable mechanism members by biasing spring action. Unidirectional resetting or multi-directional resetting are provided for. Displacement of the mechanism members attached to the device results in biasing spring loading and concurrent progressively increasing frictional damping as stroking movement of the device progresses toward end of stroke.

8 Claims, 6 Drawing Figures

LINEAR FRICTION DAMPED MECHANISM-RETURN DEVICES

This invention relates to mechanism-return devices adapted for resetting relatively moveable members, and is more particularly concerned with linear devices of this kind embodying an improved friction damping capability.

Various and sundry linear shock absorber devices have been proposed for attenuating shock producing or impulsive movements in various types of apparatus. Such devices are characterized by a relatively high initial force resistance for maximum shock attenuation in a limited stroke range.

There are, however, instances where shock or impulse attenuation is of only minor concern with respect to relatively moveable mechanism members; and there is need for resetting the relatively moveable members, that is, returning the members to relative positions from which they have been displaced relative to one another in a mechanism function. Movement may be at uniform speed, accelerative, decelerative, or combinations of such movements, but in any event requiring resetting of the members to a desired spaced or starting relationship.

A principal aim of the present invention is to attain improved motion control and resetting of relatively displaceable mechanism members.

The present invention provides a linear stroke friction damped device adapted for resetting relatively moveable mechanism members, and comprising an elongate tubular housing having means at one end for attachment to one of the members; a reciprocable plunger within the housing including a projection from the opposite end of the housing for attachment to a second of the members; means for normally biasing the plunger outwardly relative to said opposite end so that the projection is protracted relative to the housing but permitting member-induced relative telescopic stroking of the plunger and housing; stop shoulder means for defining an outward biasing stroke limit for the plunger; and friction damping means adapted for minimal damping during beginning of inward telescopic stroking relative movement of the housing and plunger, and adapted for attaining progressively increasing frictional damping as the inward telescopic stroking movement progresses toward end of stroke.

In various embodiments of the invention, one-way resetting control, and two-way centering resetting control are provided for.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure and in which.

Figure 1:
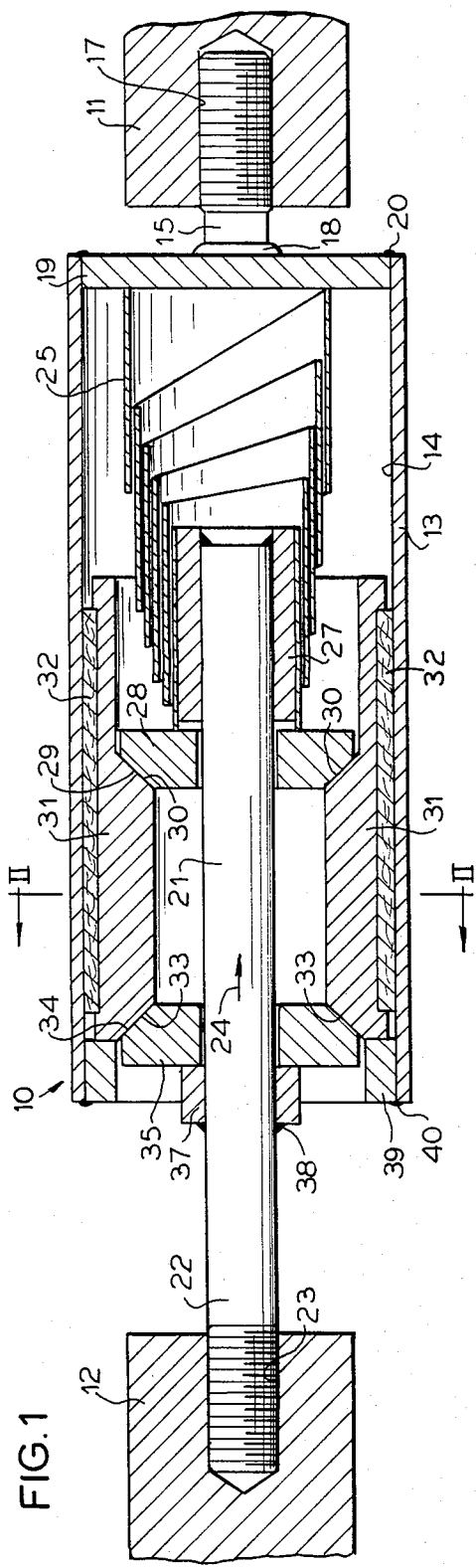
FIG. 1 is a longitudinal sectional detail view through a single stroke device embodying the present invention.
Figure 2:
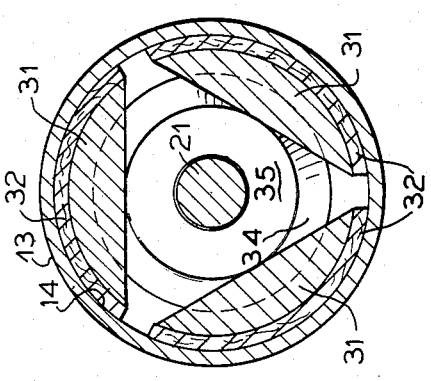
FIG. 2 is a transverse sectional detail view taken substantially along the line II—II of FIG. 1.

Referring to FIGS. 1 and 2, a linear stroke friction damped return device 10 is adapted for resetting relatively moveable mechanism members 11 and 12 which may be of any preferred form for the particular apparatus in which they may have any desired function, but are characterized in each cycle of operation by being relatively displaced toward one another from a spread apart starting position and to which position they must be returned or reset. In this instance it is presumed that the members 11 and 12 are relatively displaced toward one another, e.g., one of the members toward the other, or both members concurrently toward one another, by force applied by the associated apparatus, and the device 10 is relied on for returning or resetting the members with respect to their starting position.

In a desirable construction, the device 10 comprises an elongate tubular barrel housing 13, preferably having a cylindrical inner wall 14. At one end the housing 13 has means comprising a coaxial stud 15 which may be threadedly engaged in a bore 17 in the member 11. Attachment of the stud 15 to the end of the housing 13 is desirably by having the base of the stud secured as by means of welding 18 to a closure plate 19 which is fixedly secured to and across the end of the housing 13 as by means of welding 20.

A reciprocable rod-like plunger 21 coaxially within the housing 13 includes a terminal projection 22 from the opposite end of the housing for attachment to the member 12 as by being threaded into a bore 23 in this member. The construction and relationship of the housing 13 and the plunger 21 is such that the plunger 21 is normally biased outwardly relative to the end from which the projection 22 extends so that the projection is protracted relative to the housing 13 but relative telescopic stroking of the plunger and the housing is permitted, as indicated by directional arrow 24 by mechanism force which drives the members 11 and 12 toward one another.

Biasing means acting on and between the housing 13 and the plunger 21 desirably comprises an expansile, axially collapsible telescopic cylindrical coil, substantially conical volute spring 25 having its larger diameter base end seated against the inner face of the end closure 19 and with its progressively diminishing diameter spirals of desirably equal length progressively projecting to the desired overall spring length. At the smallest diameter axially inner terminal spiral of the spring 25 it is looped in closely engaging spring-centering relation about an elongate collar 27 fixed on the inner end portion of rod-like plunger 21. The outer terminal end of the spring terminal loop thrusts against a thrust shoulder disk 28 which is loosely slidably engaged about the plunger 21. This causes an annular frustoconical shoulder surface 29 on the shoulder disk 28 to thrust against complementary oblique cam surfaces 30 on friction damping means shoes 31 of which there are three identical and equally circumferentially spaced and provided with radially outwardly facing friction material facings 32. Substantially spaced from the oblique cam surfaces 30 on the shoes 31 are radially inwardly oblique cam surfaces 33 in mirror image relation to the cam surfaces 30 and engaging a complementary frustoconical surface 34 on a thrust disk 35 desirable the same as the disk 28 but disposed in reversed opposition relation thereto in loosely slidable engagement about the plunger 21 and shouldering against a shoulder collar 37 engaged about the plunger 21 and fixedly secured thereto as by means of welding 38. At their outer ends, the shoes 31 are engageable against stop shoulder means provided by a stop ring 39 within the adjacent end of the housing 13 and which may be secured to the housing as by means of welding 40. It will be observed that the stop-ring 39 is of smaller inside diameter than the outside diameter of the thrust disk 35 which is thereby received freely within the ring 39.

In operation, the device 10 is adapted to be normally in the axially expanded condition shown in FIG. 1. That is, the spring 25 under a preferably minimal preload biases the plunger 21 by acting through the thrust disk 28, the shoes 31, the thrust disk 35 and the shoulder collar 37, outwardly opposite to the arrow 24 and relative to the housing 13 to the extent permitted by the stop shoulder 39. In this relationship, the friction damping means shoes 31 are in minimal damping engagement with the housing cylinder wall 14. Upon telescopic stroking relative movement of the housing 13 and the plunger 21 caused by relative movement of the members 11 and 12 toward one another, and consequent progressive loading of the spring 25, a progressive radial expansion of the damping shoes 31 attains progressively increasing frictional damping as the inward telescopic stroking movement progresses toward end of stroke.

Figure 3:
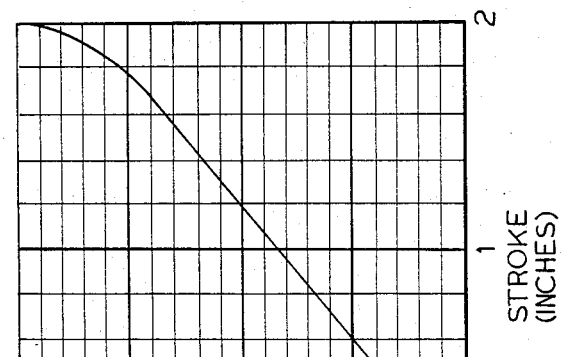
FIG. 3 is a stroke/force chart for the device of FIG. 1

By way of example, FIG. 3 is referred to for a graphic display of the damping and spring load force adapted to be generated in operation of the device 10 where it is designed for a maximum two inch stroke a maximum 200 pounds end of stroke spring load. As will be observed a virtually straight line progressive damping and spring load curve is maintained in this instance up to about 150 pounds per square inch resistance and then a more rapid resistance to about 200 pounds per square inch. As the volute spring 25 approaches maximum compression, the friction damping shoes 31 attain corresponding loading and thus frictional damping effect which is reflected in the upward movement of the resistance curve on the chart. During return stroke, depending on resistance by the members 11 and 12 to resetting bias of the device 10, descent of the curve on the chart of FIG. 3 will approximate the ascending curve during telescopic stroking of the device 10. This performance curve is attained efficiently in a minimum device package wherein the volute spring 25 operates with a nonlinear spring rate. The preferably dry friction damping afforded by the friction shoes 31 provides for energy dissipation and assures smooth, shock resistant operation of the mechanical system comprising the members 11 and 12 and the device 10.

Figure 4:
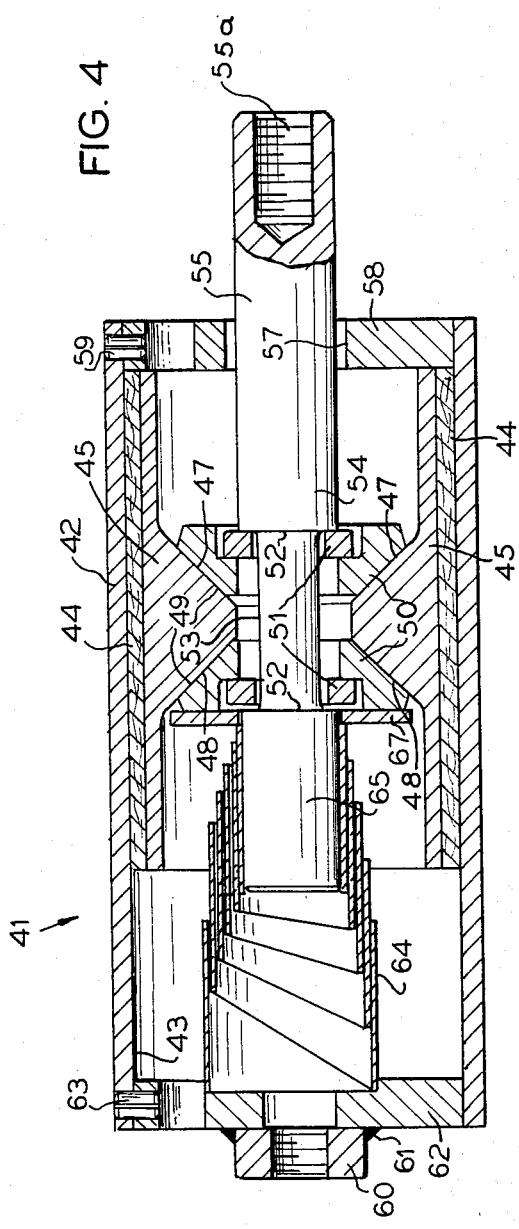
FIG. 4 is a longitudinal sectional detail view showing a modification of the single stroke device.

In FIG. 4 a linear stroke friction damped device 41 adapted for resetting relatively moveable mechanism members is of a somewhat more rugged construction than the device 10 of FIG. 1, but may be adapted for about the same force displacement and damping characteristics as demonstrated in the chart of FIG. 3. To this end, the device 41 comprises a cylindrical barrel housing 42 having a preferably dry inner cylinder wall 43 for frictional engagement by friction material facings 44 of friction damping means shoes 45 of which there may be three equal shoes similarly as in the device 10. However, the shoes 45 are provided intermediate the length of their inner sides with convergently inwardly tapered generally axially oppositely facing cam surfaces 47 and 48 engaged by respective fructoconical camming surfaces 49 of substantially identical shoe spreader thrust rings 50 which are engaged by respective thrust washers 51 opposed by respective spaced shoulders 52 at opposite ends of a reduced diameter intermediate portion 53 of an elongate rod-like reciprocable plunger 54 disposed axially within the housing 42. The plunger 54 includes a stem projection 55 which extends from one end of the housing through a clearance hole 57 in an end closure plate 58 secured as by means of one or more lock pins 59 in that end of the tubular housing 42. The closure 58 serves as a maximum expansion stop engageable by the adjacent ends of the shoes 45.

A threaded bore 55a in the outer end of the plunger stem projection 55 adapts the projection for attachment to one of relatively moveable mechanism members (not shown), corresponding to the members 11 and 12 in FIG. 1. The other of the relatively moveable members is adapted to be attached to an internally tapped boss 60 secured as by means of welding 61 coaxially to a closure plate 62 secured as by means of one or more pins 63 in the end of the housing 42 opposite the closure plate 58.

Means for normally biasing the plunger 54 outwardly relative to the housing 42 comprises a telescopic cylindrical coil, generally conic, volute spring 64 which has its large diameter end seated coaxially on the end closure 62 and has its smaller diameter end coil engaged about a centering terminal 65 on the inner end of the plunger 54. The small terminal end coil of the spring thrusts endwise against a thrust disk 67 engaging the adjacent spreader ring 50.

Operation of the device 41 is substantially the same as described in connection with the device 10, that is, minimal friction damping and biasing spring action occurs at the beginning of inward telescopic striking relative movement of the housing 42 and the plunger 54. Progressively increasing frictional damping and biasing spring resistance then develops as inward telescopic stroking movement progresses toward the end of stroke. Depending on the resistance toward resetting of the members with which the device 41 is operatively connected, a reverse action, that is progressive diminishing of frictional damping and spring load, occurs in the return or expansion stroke of the device 41.

Figure 5:
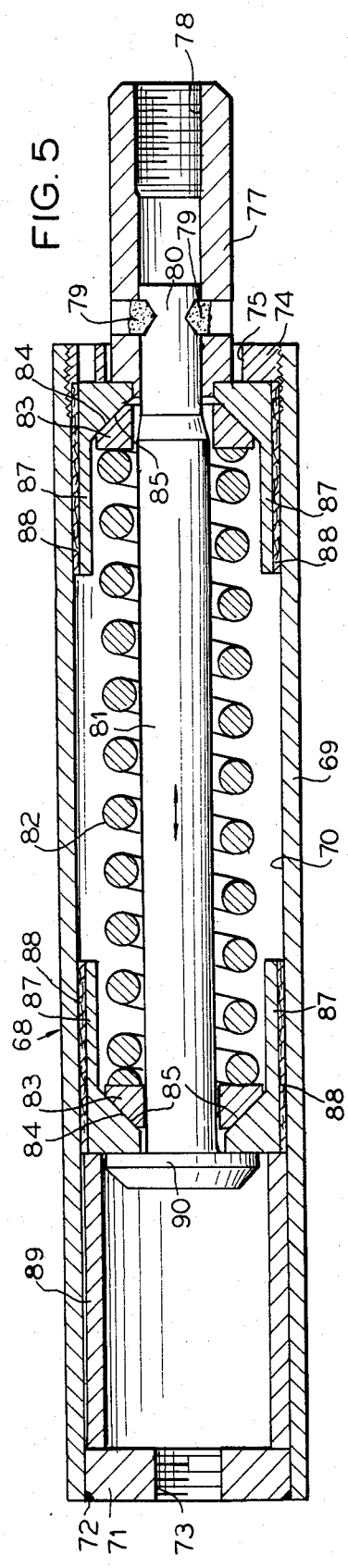
FIG. 5 is a longitudinal sectional detail view showing a two stroke embodiment of the device.

For some purposes it may be desirable to provide a two way biasing, mechanism centering capability, as exemplified by the linear stroke friction damped device 68 of FIG. 5. For this purpose, the device 68 comprises an elongate tubular cylindrical barrel housing 69 having an inner cylinder wall 70. At one end the housing 69 is closed by a closure disk or plate 71 which may be secured fixedly in place as by means of welding 72 and a tapped bore 73 permits attachment of the device to one of relatively moveable mechanism members (not shown) but exemplified in FIG. 1 by the members 11 and 12. At the opposite end of the housing 69 a closure disk 74 may be threadedly secured into the end of the housing. An axial clearance opening 75 through the closure 74 permits free reciprocal movements therethrough of a plunger stem projection 77 providing means such as a tapped outer end bore 77 for attachment to the second of the relatively moveable members.

In this instance, the extension 77 comprises a sleeve which is fixedly secured as at 79 to an outer end portion 80 of an elongate rod-like plunger 81 which is reciprocably received within the housing 69. Means for normally biasing the plunger 81 outwardly relative to the housing 69 comprises a cylindrical, coiled compression spring 82 which is freely engaged about the plunger and thrusts under preload in opposite axial directions against respective thrust rings 83 which have oppositely axially facing annular cam surfaces engaging respective complementary oblique cam surfaces 85 of respective axially spaced sets of radially expansible friction shoes 87 having friction faces 88 engaging the cylinder walls 70. Desirably, there are three of the friction shoes 87 in each set, similarly as the friction shoes 31 in FIG. 1, except that the friction shoes 87 have only one cam face 85 on each shoe. The ends of the shoes 87 adjacent to the end closure 74 are adapted to engage the same as stop shoulder means for defining an outward biasing stroke limit for the plunger 81.

At the inner end of the plunger 81, the adjacent shoes 87 thrust against stop shoulder means in the form of a spacer sleeve 89 which seats at its outer end against the end closure 71 and is of a length to stop the adjacent shoes 87 in sufficiently spaced relation to the end closure 71 to afford ample stroking clearance for the inner end of the plunger 81, and more particularly an enlarged diameter head 90 fixedly, and preferably integrally carried on the inner end of the plunger. By engagement of the contiguous ends of one set of the shoes 87 against the axially confronting face of the head 90, and by engagement of the ends of the other set of the shoes 87 against the inner end of the extension sleeve 77, the spring 82 is adapted to be maintained under a desirable preload. This is advantageous in situations where it is necessary to return to a relatively centered relationship the relatively moveable mechanism members to which the device 68 is attached. That is, where the mechanism members are moveable cyclically both toward one another and away from one another in response to apparatus force, the device 68 operates for normally biasing the members to an initial or centered relationship. For example, when the mechanism members move apart, the plunger head 90 is caused to drive the adjacent friction shoes 87 away from the shoulder sleeve 89, while the shoes 87 at the opposite end of the plunger are held against displacement by the shoulder provided by the closure disk 74. As the spring 82 becomes loaded during such movement, radial force generated through the thrust ring 83 adjacent to the head 90 causes progressive radially outward expansion force to be applied to the associated shoes 87 and thus develops progressively increasing frictional damping as the relative axial expansion of the housing 69 and the plunger 81 progresses toward the end of the expansion stroke. The loaded biasing spring 82 functions to return the device 68 and the moveable mechanism members to the centered relation. On the other hand, when the moveable mechanism members are caused by apparatus forced to move toward one another, the shoulder provided by the inner end of the extension 77 on the plunger drives the adjacent friction shoes 87 axially inwardly, while the shoes at the inner end of the plunger are held by the shoulder sleeve 89 against movement. As a result, the shoes 87 adjacent to the outer end of the plunger are expanded by the thrust ring 83 progressively as the spring 82 is compressed, attaining progressively increasing frictional damping as the inward telescoping stroking movement of the plunger 81 and the housing 69 progresses toward end of stroke. Upon release of the mechanism member force which caused the inward telescopic stroking, the spring 82 again causes the device 68 and the mechanism members to be returned to the centered relationship.

Figure 6:
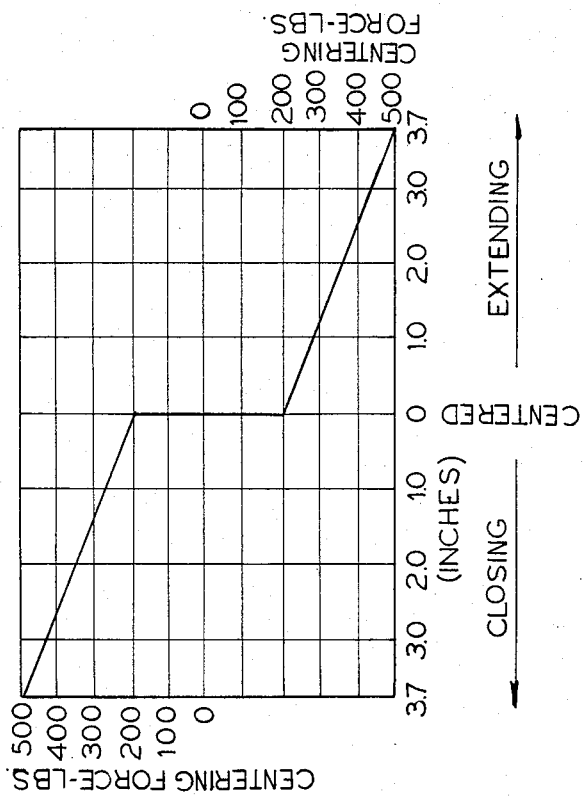
FIG. 6 is a stroke/force diagram related to the device of FIG. 5.

In FIG. 6, the equal and opposite centering force capability of the device 68 is graphically depicted. In this instance, the device 68 is equipped for a compression and friction damping stroke of 3¾ inches in both directions from the centered or at rest condition of the device 68. The arrangement is such that starting from the centered position at which the spring 82 may be under 200 psi preload, a straight line curve throughout the length of stroke in either direction may be up to an end-of-stroke centering force of about 500 psi. The return stroke in either direction is also adapted to follow the straight line curve to the centered position. In the operation of the device 68 the dry friction damping furnishes energy dissipation which effects smooth shock attenuating results in respect to the components or mechanism members to be centered.

It will be understood that variations and modifications may be effected without departing from the spirit and scope of the novel concepts of this invention.

I claim as my invention:

1. A linear stroke friction damped device adapted for resetting mechanism members which thrust relatively toward one another and must be reset by movement away from one another, and comprising:

an elongate housing having an internal cylindrical surface and a closure at one end of the housing equipped with means for attachment to one of said members;

an elongate reciprocable rod-like plunger having an end portion within said housing substantially spaced from said closure and with a substantial length portion of the plunger projecting from the opposite end of said housing for attachment to a second of said members;

said opposite end of said housing having an axially inwardly facing annular stop shoulder through which said rod length extends freely;

a set of coextensive elongate friction shoes engaging said cylindrical surface and having intermediately thereon substantially spaced apart oblique cam surfaces disposed in inwardly convergent planes;

one of the ends of said shoes being adapted to thrust separably against said annular stop shoulder;

a first shoe-expanding ring mounted loosely about said plunger and arranged to be thrust by a shoulder on the plunger against the cam surfaces which are nearest said annular shoulder;

a second shoe-expanding ring mounted loosely about said plunger and engaging the cam surfaces nearest said closure;

a coiled expansion spring concentric with said plunger and seated at one end against said closure and extending at its opposite end about said inner end portion of the plunger and applying thrust to said second shoe expanding ring and thereby thrusting said shoes endwise toward said stop shoulder;

and said plunger and said housing being relatively telescopically moveable when said members move relatively toward one another whereby said shoulder on said plunger causes said first shoe-expanding ring to move with said plunger for effecting axial shifting of said shoes away from said annular stop shoulder and toward said closure, and said spring compresses between said closure and said second ring;

so that said friction shoes are progressively expanded for effecting minimal damping during the beginning of telescopic stroking relative movement of said housing and plunger, and then in the continuation of said stroking effecting progressively increasing frictional damping as stroking movement progresses toward end of telescopic stroke, said spring acting through said shoes and said rings, as an assembly, and said housing and said plunger for resetting said members.

2. A device according to claim 1, wherein said spring comprises an expansile substantially conical volute telescopic cylindrical coil spring having a large diameter and engaging said closure, and a smaller diameter end engaging about said inner end portion of the plunger and thrusting against said second shoe expanding ring.

3. A device according to claim 1, wherein said plunger has an inner end centering portion engaged within a cylindrical terminal small diameter coil of said spring, and a large diameter opposite terminal coil of the spring seats on said closure.

4. A device according to claim 3, wherein said inner end portion of the plunger carries a collar which is engaged within said small diameter coil of said spring.

5. A device according to claim 1, wherein said spring is an expansile substantially conical volute telescopic coil spring having a large diameter end engaging said closure and a small diameter end disposed about said inner end portion of said plunger and thrusting against said second shoe-expandng ring, and a centering terminal structure on said inner end portion of the plunger engaged within said smaller diameter end of said spring.

6. A device according to claim 1, wherein both of said first and second shoe-expanding rings are mounted in both axially and radially moveable relation about said rod-like plunger.

7. A device according to claim 6, wherein said stop shoulder comprises a ring element secured to said housing and having an inner diameter which is smaller than the outside diameter of said first shoe-expanding ring which is received freely within said stop shoulder ring when said one ends of said shoes thrust against said stop shoulder ring element.

8. A device according to claim 6, wherein said plunger has an intermediate portion of reduced diameter providing spaced shoulders at the opposite ends of the reduced diameter portion, and respective thrust washers received in said reduced diameter portion in confronting relation to said spaced shoulder, one of said washers being thrustably engageable with said first shoe-expanding ring, and the other of said washers being engageable with said second shoe-expanding ring, whereby said shoulders at the opposite ends of said reduced diameter portion acting through said washers are adapted to apply thrust to said shoe-expanding rings in reciprocal movements of said plunger.

* * * * *

UNITED STATES PATENT AND TRADEMARK OFFICE
CERTIFICATE OF CORRECTION

PATENT NO. : 4,505,458
DATED : March 19, 1985
INVENTOR(S) : John C. Schultz

It is certified that error appears in the above—identified patent and that said Letters Patent is hereby corrected as shown below:

In column 4, line 33, for "striking", read --stroking--;

In column 7, line 27, for "shoe-expandng" read --shoe-expanding--.

Signed and Sealed this

Tenth Day of June 1986

[SEAL]

Attest:

Attesting Officer

DONALD J. QUIGG

Commissioner of Patents and Trademarks